United States Patent Office 3,551,139
Patented Dec. 29, 1970

3,551,139
DESULPHURIZING COMPOSITION FOR TREATING IRON MELTS AND METHOD
Jan Schokkenbroek, Alkmaar, Netherlands, assignor to Koninklijke Nederlandsche Hoogovens en Staalfabrieken N.V., Ijmuiden, Netherlands
No Drawing. Filed Dec. 20, 1968, Ser. No. 785,761
Int. Cl. C21c 7/00, 7/02
U.S. Cl. 75—53                                  10 Claims

ABSTRACT OF THE DISCLOSURE

Molten pig iron is desulfurized by adding a composition consisting essentially of preferably 20 to 40% calcium diamide and the remainder consisting essentially of calcium cyanamide. It is preferred to inject the composition through a lance into the melt.

---

The present invention relates to a desulphurizing composition for treating iron melts and based on a calcium cyanamide product as hereinafter defined, and also relates to a method of desulphurizing molten iron with the said desulphurizing composition. The calcium cyanamide product referred to herein is abbreviated to CCP.

The use of CCP as desulphurizing agent, which is immersed into the melt, more especially in the form of briquettes or of similar shaped bodies, has become known from German patent specification 837,705. Fluxes can be added to the CCP for lowering the melting point and for use in metal melts which have a low melting point.

In connection with the desulphurizing of cast iron and pig iron, however, the CCP melts, so that the use of fluxes becomes suerfluous.

J. N. Hornach and E. J. Whittenberger (Journal of Metals (1956), pages 425–429) have compared with one another several pulverised desulphurizing agents, including also CCP, which were blown through a lance into the metal melt.

Because of the ever-increasing standards which are set for many constructional materials, the necessity arises of further lowering the sulphur content considered permissible in iron and steel, since the need for iron and steel with low sulphur contents is increasing. Consequently, it is necessary for iron to be desulphurized to an increasing degree. The desulphurization is normally carried out in the iron smelting plant outside the blast furnace, since in view of the frequently occurring fluctuations of the sulphur content in the iron obtained in the blast furnace, it is desirable for this to be regulated.

The technical and usual commercial CCP can be used without any previous purification for the desulphurizing operation. In this specification by CCP we mean a product which contains at least 60% by weight of calcium cyanamide (CaNCN), 10 to 12% by weight of carbon, and also calcium oxide in quantities from 15% to more than 20% by weight, and calcium carbonate in quantities from below 1% by weight to above 6% by weight as well as traces of other impurities. CCP has proved to be particularly advantageous, as compared with other known desulphurizing agents.

It is true that calcium oxide is an inexpensive desulphurizing agent; the yield when desulphurizing is, however, so poor that large quantities of calcium oxide are necessary and these cause a strong slag formation.

When desulphurizing in torpedo-shaped transportable containers, such as those which are today increasingly used, slag cannot be removed or can only be removed with very great difficulty. A strong slag formation is particularly disadvantageous in this case. Furthermore, the dust nuisance when desulphurizing with calicum oxide is considerable, whereby also particularly expensive dust-extraction plants become necessary because of the ever-increasing standards as regards permissible air pollution.

When using sodium carbonate as desulphurizing agent, smaller quantities than with calcium oxide are sufficient. Nevertheless, serious disadvantages are also found when sodium carbonate is used. The dust nuisance is still considerably greater than it is when using calcium oxide and in addition the slag is very thin, whereby it is difficult to remove and it is very aggressive, particularly with respect to the usual refractory lining of the container.

Calcium carbide is considered as a satisfactory desulphurizing agent, but the storage and conveyance thereof present considerable difficulties, which necessitate many precautionary and safety measures.

When using CCP an desulphurizing agent, the yield is substantially more favourable than with calcium oxide, and in addition also the nuisance due to dust is much less.

For storage and conveyance purposes, no special measures are necessary with CCP, such as those required with calcium carbide. The generation of gas with the decomposition of the CCP in the iron melt produces a very advantageous bath movement, which provides an intimate mixing of the melt and of the desulphurizing agent. However, particularly in comparison with calcium oxide and sodium carbonate, the CCP is substantially more costly. The higher price is however not compensated for by a better yield, i.e., the necessity to use smaller quantities.

It has now been found that the desulphurizing of iron can be carried out in a particularly advantageous manner, by making use of a desulphurizing composition in accordance with this invention, the composition comprising a calcium cyanamide product as hereinbefore defined (CCP) and a calcium diamide product as hereinafter defined and referred to as CDP. One aspect of this invention refers to the above desulphurizing composition and another aspect of this invention relates to a method of desulphurizing molten iron which comprises introducing into the melt the composition defined above.

It has surprisingly been shown that a substantially smaller quantity of the said composition compared to CCP itself will have an equivalent desulphurizing action.

CDP is obtained as follows: with the processing of CCP to melamine, cyanamide is formed in a first step in an aqueous medium of calcium cyanamide and while passing through carbon dioxide, the formed calcium hydroxide reacts with the carbon dioxide to form finely divided calcium carbonate, which precipitates. This precipitation product is CDP which consists of finely divided calcium carbonate and of about 10% by weight of the carbon which originated from the CCP.

It is to be noted that neither calcium carbonate nor CDP alone as such is effective as desulphurizing agent. For an effective desulphurization, reducing conditions are necessary. Calcium carbonate and CDP are dissociated at the temperatures of the iron melts into calcium oxide and carbon dioxide, the carbon dioxide reacting at least partly with the carbon contained in the iron and/or CDP to form carbon monoxide. On the one hand, it is true that the gas volume is substantially increased thereby, but on the other hand, the conditions are not essentially reducing. This might also be the reason why desulphurization cannot be carried out with calcium carbonate or CDP alone, although the calcium oxide which is formed does per se have a desulphurizing action. Consequently, it is all the more surprising that, when desulphurizing with a mixture of CCP and CDP, it is only necessary for producing a certain lowering of the sulphur content to use a smaller quantity of the composition in comparison with the quantity of CCP alone which otherwise has to be used. It is obviously a synergistic effect which is produced.

An additional advantage of the desulphurizing composition according to the invention is to be seen in that a nuisance due to dust with CCP, which already is at a favourable low level, is further reduced when the inventive compositions are used, although it was rather the opposite which was to be expected when adding the CDP to the CCP.

The reduction of the necessary quantity of the desulphurizing agent results in a very desirable further lowering of slag formation.

The desulphurizing compositions according to the invention preferably contain 40 to 90% by weight, e.g. 60 to 80%, and advantageously about 70% by weight of CCP, and, correspondingly, 60 to 10% by weight, e.g. 40 to 20% and advantageously about 30% by weight of CDP. The percentages are related to the total weight of the desulphurizing composition. In addition, it is a particular advantage that very substantial desulphurization and indeed even practically complete desulphurization can be effected with the desulphurizing composition according to the invention, i.e. a very low sulphur content of, for example, a few thousandths of a percent by weight can be reached easily and in a satisfactory reproducible manner.

In the manufacture of steel, liquid iron is required which has a sulphur content which fluctuates very little and advantageously does not amount to more than 0.030% by weight. By using the desulphurizing composition according to the invention, such low contents can be achieved very easily and more especially in a reproducible manner.

The desulphurization of liquid iron with the desulphurizing composition according to the invention is advantageously carried out in such a way that the desulphurizing agent is injected through a lance into the molten iron which is to be desulphurized, whereby a more intimate and longer contact of the desulphurizing agent with the molten iron is obtained and a high level of desulphurization is attained. Other suitable measures can also be employed for thoroughly mixing molten iron and the desulphurizing composition.

The invention is illustrated by the following examples without however being restricted thereto.

EXAMPLE 1

Comparison A.—Pig iron with a sulphur content of 0.094% by weight was desulphurized with CCP alone in a manner known per se. By using 13.5 kg. of CCP per metric ton of liquid pig iron, the sulphur content could be lowered to 0.027% by weight.

Procedure illustrating the invention.—A pig iron similar to that used in "Comparison A" above but with a sulphur content of 0.098% by weight was desulphurized with a mixture of 70% by weight of CCP and 30% by weight of CDP. For desulphurization down to the same sulphur content as in comparison test A, only 11 kg. of the mixture were necessary per metric ton of pig iron.

EXAMPLE 2

Comparison B.—Pig iron with a sulphur content of 0.085% by weight was desulphurized with CCP alone in a manner known per se. By using 14.2 kg. of CCP per metric ton of liquid pig iron, the sulphur content could be lowered to 0.035% by weight.

Procedure illustrating the invention.—A pig iron similar to that used in "Comparison B" above but with a sulphur content of 0.086% by weight was desulphurized with a mixture of 70% by weight of CCP and 30% by weight of CDP. Of this mixture, there was used a quantity per metric ton of liquid pig iron which was as far as possible the same as the quantity of the comparison test B. In actual fact, the quantity here was 13.8 kg. per metric ton. By this means, however, the iron was desulphurized down to a sulphur content of 0.017% by weight.

What we claim is:

1. A desulphurizing composition for treating iron melts consisting essentially of a calcium, diamide product as hereinbefore defined.
2. A desulphurizing composition according to claim 1, wherein the said calcium diamide amounts to 10 to 60% by weight of the desulphurizing composition.
3. A desulphurizing composition according to claim 1, wherein the said calcium diamide amounts to 20 to 40% by weight of the desulphurizing composition.
4. A method of desulphurizing molten iron which comprises introducing into the melt a composition as defined in claim 1.
5. A method according to claim 4, wherein the said composition is injected through a lance into the melt.
6. A method of desulphurizing molten iron which comprises introducing into the melt a composition as defined in claim 2.
7. A method according to claim 6, wherein the said composition is injected through a lance into the melt.
8. A method of desulphurizing molten iron which comprises introducing into the melt a composition as defined in claim 3.
9. A method according to claim 8, wherein the said composition is injected through a lance into the melt.
10. A method according to claim 9, wherein the said composition is injected through a lance into the melt.

References Cited

UNITED STATES PATENTS

| | | | |
|---|---|---|---|
| Re. 13,343 | 12/1911 | Acker | 23—190 |
| 1,335,370 | 3/1920 | Ellis | 75—58X |
| 1,359,080 | 11/1920 | Liebknecht | 23—190 |
| 2,747,990 | 5/1956 | Morrogh | 75—53X |
| 2,749,237 | 6/1956 | Jordan | 75—53X |
| 3,350,242 | 10/1967 | Fuchs | 75—53X |

L. DEWAYNE RUTLEDGE, Primary Examiner

J. E. LEGRU, Assistant Examiner

U.S. Cl. X.R.

75—58, 130